United States Patent [19]

Bieringer et al.

[11] 4,120,590

[45] Oct. 17, 1978

[54] METHOD FOR MEASURING THE THICKNESS OF TRANSPARENT ARTICLES

[75] Inventors: Robert J. Bieringer, Toledo; James A. Ringlien, Maumee, both of Ohio

[73] Assignee: Owens-Illinois, Inc., Toledo, Ohio

[21] Appl. No.: 803,000

[22] Filed: Jun. 3, 1977

[51] Int. Cl.$^2$ .............................................. G01B 11/00
[52] U.S. Cl. ................................................... 356/161
[58] Field of Search ........................ 356/120, 161, 209

[56] References Cited

U.S. PATENT DOCUMENTS

| 1,756,785 | 4/1930 | Gallasch | 356/161 |
| 2,253,054 | 8/1941 | Tuttle et al. | 356/120 |
| 3,807,870 | 4/1974 | Kalman | 356/161 |

FOREIGN PATENT DOCUMENTS

| 40,230 | 8/1965 | German Democratic Rep. | 356/161 |

*Primary Examiner*—John K. Corbin
*Assistant Examiner*—R. A. Rosenberger

*Attorney, Agent, or Firm*—Steve M. McLary; Myron E. Click; David H. Wilson

[57] ABSTRACT

A method for measuring the thickness of transparent articles utilizing a plural component light beam. In the most general sense, the present invention involves the generation of a plural component light beam which is generally symmetric about the optic axis of the system. The light distribution which results from this arrangement is used to illuminate a transparent article. The result is separate reflections from the front and rear surfaces of the article for all of the components of the light beam. If these reflections are imaged in a detector plane which is conjugate to a plane in the vicinity of the article, a pair of co-planar images are formed, one image representing reflections of all of the plural components from the rear surface and the other image representing reflection of all of the plural components from the front surface. Measurement of the average separation of the images will give a value that is proportional to the thickness of the article at a point lying along the optic axis of the system.

4 Claims, 4 Drawing Figures

METHOD FOR MEASURING THE THICKNESS OF TRANSPARENT ARTICLES

BACKGROUND OF THE INVENTION

This invention generally relates to optical techniques for the measurement of the thickness of transparent articles. More specifically, this invention relates to the use of a plural component light beam for making such a measurement.

The use of optical techniques for measuring the thickness of transparent articles is known in the art. For example, U.S. Pat. No. 3,307,446 teaches the use of a slit type or linear illumination system in the measurement of the thickness of glass tubing. This system is relatively sensitive to the position of the article being measured and will suffer error due to the lack of parallelism of the two surfaces of the wall of the tubing being measured. This particular type of measurement error will be discussed in further detail herein. U.S. Pat. No. 3,807,870 teaches a somewhat similar system. Also known in the prior art is the use of interference patterns for making thickness measurements of transparent articles. Examples of these systems will be seen in U.S. Pat. No. 2,518,647; 3,709,610; 3,720,471; and 3,994,599. The present invention, by the use of a plural component beam of light as the illumination source, avoids errors due to non-parallelism of the surfaces being measured and the positional sensitivity problems of the prior art. Additionally, the complexity inherent in interference type measurement systems is likewise avoided.

SUMMARY OF THE INVENTION

Our invention resides in a method for measuring the thickness of transparent articles. A plural component beam of light is generated and then optically converged. The transparent article to be measured is illuminated with this convergent plural component beam of light thereby causing two separate reflections for all components of the plural component beam of light. One of these reflections represents reflection from the front surface of a transparent article and the other reflection represents reflection from the rear surface of the transparent article. The reflections of both are projected onto a detector plane which is conjugate to a plane in the vicinity of the article to thereby give two separate co-planar images of the plural component beam of light. Measurement of the average separation of these two separate images gives an index of the thickness of the article being measured at a point along the optic axis of the system.

DETAILED DESCRIPTION OF THE DRAWINGS

Figure 1:
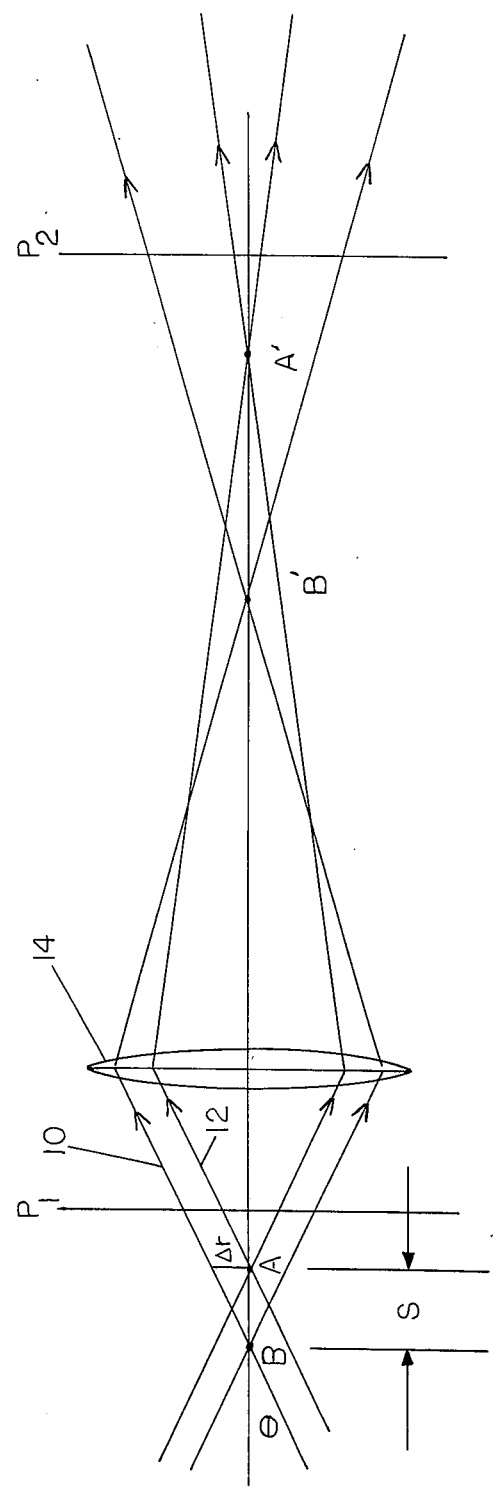
FIG. 1 is a schematic representation of the generation of the two reflected images from the convergent plural component beam of light.

FIG. 1 illustrates the general optical principles upon which the present invention is based. Although there are numerous optical techniques now known to measure the thickness of transparent plates, all of such known techniques are sensitive to measurement error when the surfaces being measured exhibit, to an unknown degree, lack of parallelism, hereinafter as referred to as wedge. In these systems, the basic principle involves the measurement of the separation of reflections from the front and rear surfaces of such a transparent article that is to be measured. In the case of a flat transparent plate, if such plate is placed in the vicinity of the focus of a convergent beam of light with its axis normal to the plate, reflection from the two surfaces of the plate will result in two point sources which are separated longitudinally by a distance given by the formula $$S = 2t/n,$$

where $t$ is the plate thickness, assuming the surfaces to be parallel, and $n$ is the refractive index of the material being measured. Note that the separation $S$ of the point sources is independent of the location of the plate.

Problems in the utilization of this relatively simple procedure appear when one optically images the point sources and tries to measure the longitudinal separation. This image separation is proportional to the square of the imaging system's lateral magnification and is therefore quite sensitive to the position of the plate. In order to avoid this positional dependence, one must work with light distributions in planes which are transverse to the optic axis at fixed object-image distances (conjugate planes).

In the most general sense, the present invention involves the generation of a plural component light beam which is generally symmetric about the optic axis of the system. The light distribution which results from this arrangement is used to illuminate a transparent article. The result is separate reflections from the front and rear surfaces of the article for all of the components of the light beam. If these reflections are imaged in a detector plane which is conjugate to a plane in the vicinity of the article, a pair of co-planar images are formed, one image representing reflection of all of the plural components from the rear surface and the other image representing reflection of all of the plural components from the front surface. Measurement of the average separation of the images will give a value that is proportional to the thickness of the article at a point lying along the optic axis of the system. In the following discussion, the plural component beam of light will be represented by a hollow cone of light. However, two bars of light or linear slits would also work. Likewise, if such could be readily generated, a square or rectangular pattern could also be used. The important factor is that there are at least two separate components present in the illumination beam, as opposed to the prior art which used only a single component in the illumination beam.

The use of a hollow convergent beam of light eliminates many of the sensitivity factors present in the systems of the prior art. Such a hollow convergent beam of light may be produced by placing an annular aperture in the path of the output beam of the light source used. When this annular aperture is used, such a technique results in pairs of annular rings being formed in planes transverse to the optic axis. In the case of a transparent plate which is being measured using this hollow convergent beam, the radii of the resulting rings change as the plate is moved along the optic axis. However, their annular separation will remain constant in both the object and image spaces. In FIG. 1, points A and B represent point sources which result from reflection by a plate being measured. The plate itself and the source are not shown in FIG. 1 for purposes of simplicity. Further, the hollow light cones are represented only by their central rays in the meridional plane shown in the figure. Observe that this representation could also be for a system using two linear slits of light as the illumination beam. The laws of reflection and refraction require that the light rays designated as 10 and 12 in FIG. 1 are parallel. Since this is so, their separation in the plane designated as $P_1$ is equal to that in the planes which contain the sources A and B. The annular separation of the rings in $P_1$ may then be given by the formula $$\Delta r = S \tan \theta,$$

where $\theta$ is the angle of incidence of either ray upon the plate being measured. If the input beam has a radius of $R_o$ at the lens and is focused at a distance I beyond the lens (see FIG. 4), the angle of incidence will be given by $\tan \theta 0 = R_o/I$, so that $\Delta r = SR_o/I$. The annular separation of the rings $\Delta r'$ in an image plane conjugate to $P_1$ such as the plane designated as $P_2$ in FIG. 1, will be related to $\Delta r$ through a constant lateral magnification factor M provided by a lens 14. Thus it may be seen that $\Delta r' = M\Delta r = MSR_o/I = (2MR_o/nI)t$, the coefficient of $t$ being independent of the position of the plate. The only restriction upon the position of the plate results from the requirement that all reflected light be collected by the optical system. By assuring $R_o$ is smaller than the entrance pupil of the optical system the range of allowable plate positions can be made relatively large. Furthermore, the magnification factor M can be tailored to produce images compatible with a variety of detector arrays placed in an image plane.

Figure 2:
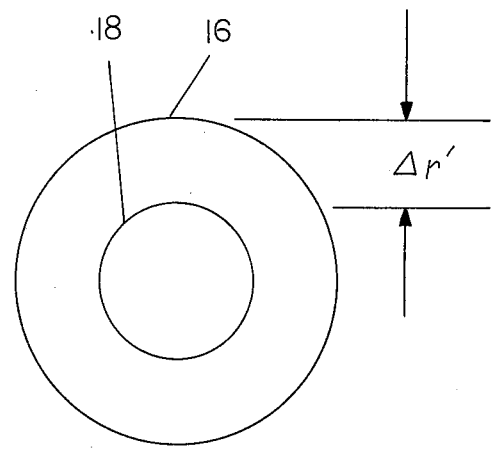
FIG. 2 is a representation of the image of two reflected hollow cones of light in a conjugate plane in the absence of non-parallelism of the surfaces of the article being measured.
Figure 3:
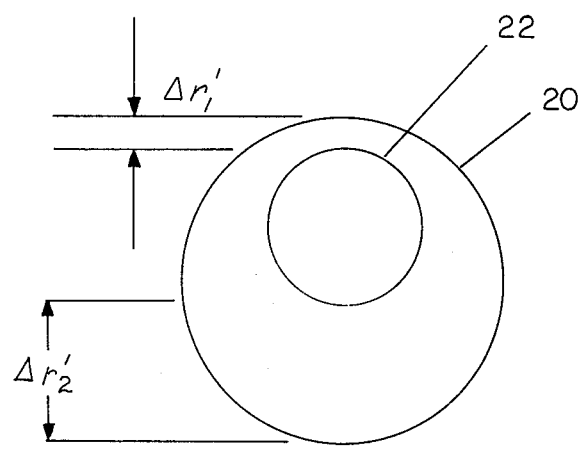
FIG. 3 is a representation of the image of two reflected hollow cones in a conjugate plane when the article being measured does have non-parallel front and rear surfaces.

FIGS. 2 and 3 illustrate the formation of the rings discussed with respect to FIG. 1 and further illustrate the image obtained when a plate being measured has wedge present in it. In FIG. 2, the rings shown illustrate the situation when a transparent plate is measured that has parallel surfaces. The rings designated as 16 and 18 in FIG. 2 are concentric. This situation would allow one to measure the dimension $\Delta r'$ at any azimuthal location in the plane designated as $P_2$. In such a case, the annular aperture of the present invention could be replaced with a slit displaced a distance $R_o$ from the optic axis, thereby resulting in a pair of lines with separation of $\Delta r'$ in plane $P_2$. However, this is the technique of the prior art and fails to take into account the realities of the measurement of such plates which generally do include wedge. That is, plates which are measured by this technique are usually not perfectly parallel and thus do not lend themselves to the use of a slit type aperture. Rather, the hollow cone of light used in the present invention compensates for this non-parallelism.

FIG. 3 illustrates the condition which occurs as a result of a plate exhibiting wedge or non-parallel front and rear surfaces. In this situation, rings designated as 20 and 22 are clearly not concentric. There are therefore two measurements of separation which may be made, namely $\Delta r'_1$ and $\Delta r'_2$. However, it is still possible to obtain valid information relative to local average thickness by averaging the values of $\Delta r$ obtained in this fashion. This is a simple averaging technique, in that $\Delta r'$ average is equal to $(\Delta r'_1 + \Delta r'_2)/2$. Thus this measurement of the average $\Delta r'$ yields an accurate measurement of local thickness even in the presence of significant wedge or non-parallelism of the surfaces of the object being measured.

While the foregoing examples have been specifically directed toward flat plates, the present technique may also be used to measure transparent articles with cylindrical walls, such as glass containers or glass tubing. A complicating factor resulting from this particular situation is that the images of the point sources now suffer from astigmatism and result in elliptical rings as opposed to the circular rings produced with flat planes. Any measurement made of $\Delta r'$ must therefore be confined to a direction defined by the intersection of the plane $P_2$ and a plane containing the cylinder axis (hereinafter the axial plane). Since linear detector arrays usually have a small but finite width, however, one must also be concerned with light which lies in the plane orthogonal to the axial plane, or transverse plane. An estimate of the effect created by this astigmatism is simply obtained by comparing the separation of the two point sources as perceived in these two planes. Using the techniques of Gaussian Optics, the point sources separations in the axial and transverse planes were calculated as follows:

$$S_{axial} = 2t/n$$

$$S_{transverse} = \frac{Rd}{R - 2d} - \frac{R^2(nd - 2t) + Rtd(2 - n)}{nR^2 + R[t(2 - n) - 2nd] + 2td(n - 1)}$$

In the foregoing relationships, R is the radius of curvature of the outer wall surface being measured and $d$ is the distance from this wall to the focus of the input beam, being considered positive toward the center of the cylinder. This result clearly exhibits sensitivity to wall position. For the most simple case of $d$ equals 0, the above equation reduces to $$S_{transverse} = \frac{S_{axial}}{1 + \frac{t}{R}\left(\frac{2}{n} - 1\right)}$$

This indicates that the astigmatic effects are more pronounced for large $t/R$. Representative calculations indicate that these effects are negligible in the vicinity of $d = 0$. Computer calculations based upon the exact equations further indicate that for larger radii the restrictions placed upon $d$ are much less severe and permit the use of commercially available linear detector arrays.

Figure 4:
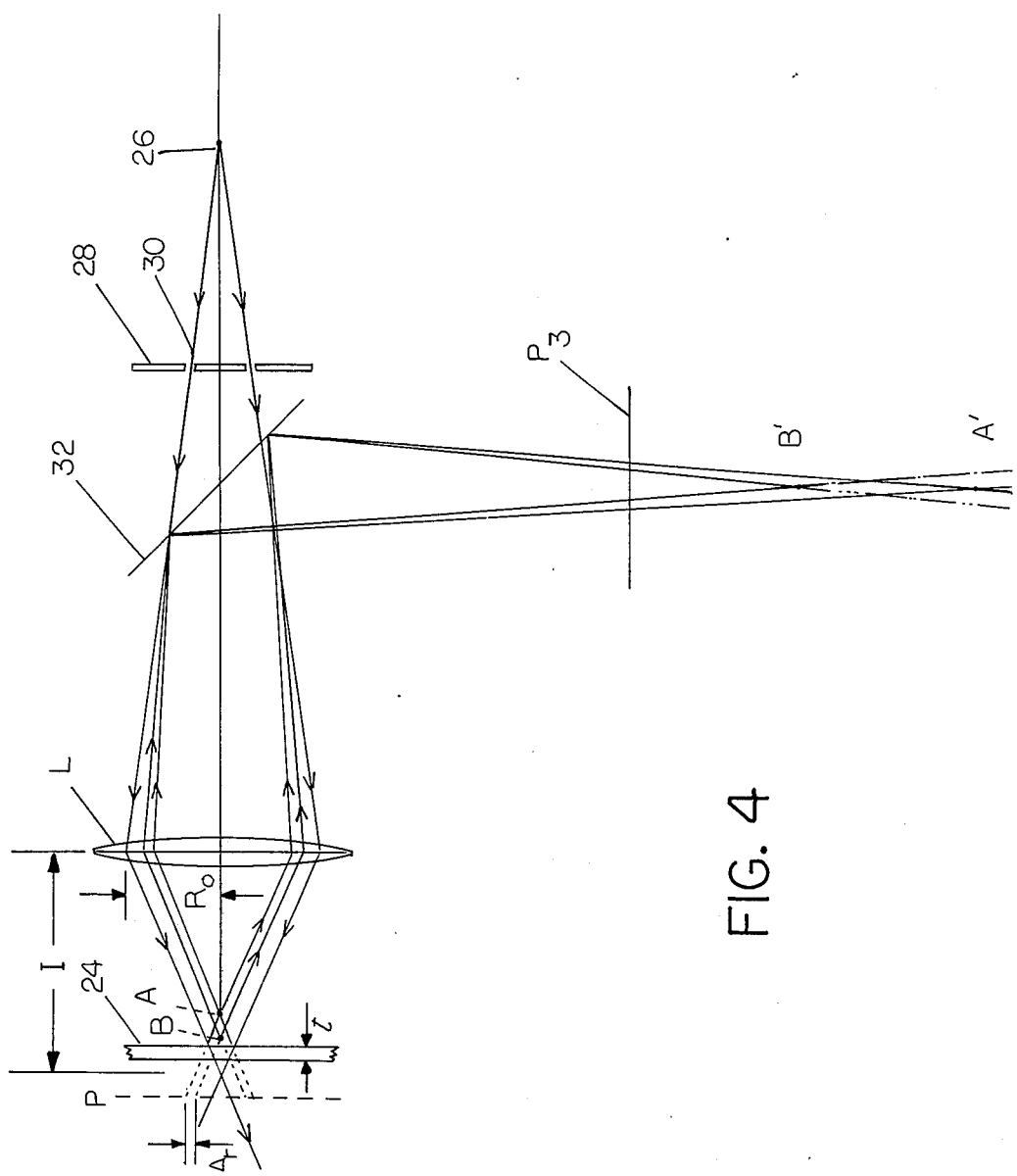
FIG. 4 is a schematic representation of a complete system illustrating the present invention.

In FIG. 4, a schematic representation of a system using the principles previously described to measure the thickness of a plate of transparent material 24 is illustrated. Illumination is furnished from a point light source 26. This is then modified by an opaque aperture plate 28 having a circular opening 30 formed therein to give the hollow cone of light as one example for the operation of the present invention. This divergent hollow cone of light then passes through the lens L and is focused a distance I beyond the lens. The radius of the input beam is shown as being $R_o$. As has been previously illustrated with respect to FIG. 1, the plate 24, which has a thickness designated as $t$, will form two point sources A and B. The source A results from reflections from the front surface and the source B results from reflections from the back surface. These sources pass light back through the lens L. In the optical path between the lens L and the point source 26 is positioned a beam splitter 32. The beam splitter 32 allows about one-half of the light which comes from the aperture plate 28 to pass through the lens L. About one-half of the light coming through the lens L from the sources A and B is reflected by the beam splitter 32. The light from the beam splitter is then imaged upon a conjugate detector plane $P_3$. In this respect, the plane $P_3$ may be considered to be the equivalent of the plane $P_2$ described with respect to FIG. 1. That is, the cone of light has now been divided into two separate components as represented by the sources A and B representing the front and rear surfaces of the plate 24. Their separation designated as $\Delta r$ may now be used as a measure of the thickness $t$ of the plate 24. The conjugate plane $P_3$ would contain a suitable detector array to allow determination of the dimension $\Delta r$ to act as a measure of the thickness $t$. Note that the relationship has previously been demonstrated, and simple fixed processing techniques may be used to obtain numerical values of $t$ if desired.

What we claim is:

1. A method for measuring the thickness of transparent articles which comprises the steps of:

generating a plural component beam of light;

optically converging said plural component beam of light;

illuminating said transparent article with said convergent plural component beam of light thereby causing two separate reflections for all components of said plural component beam of light, one of said reflections representing reflection from the front surface of said transparent article and the other said reflections representing reflection from the rear surface of said transparent article;

projecting said reflections onto a detector plane which is conjugate to a plane in the vicinity of said article to thereby give two separate co-planar images of said plural component beam of light; and measuring the average separation of said two separate images as an index of the thickness of said article at a point along the optic axis of the system.

2. The method of claim 1 wherein the step of generating a plural component beam of light comprises the steps of:

positioning an opaque plate containing a circular aperture therein along the optic axis of the system; and directing a source of light onto said opaque plate to thereby cause generation of a divergent hollow cone of light.

3. The method of claim 2 wherein the projection of said reflections onto said detector plane will result in images of circles, one of said circles lying within the circumference of the other, and wherein the step of measuring the average separation of said two separate images comprises the step of:

determining the average difference in radii of said two circles.

4. The method of claim 1 wherein the step of generating a plural component beam of light comprises the steps of:

positioning an opaque plate containing two elongated parallel openings therein along the optic axis of the system; and directing a source of light onto said opaque plate to thereby cause generation of two parallel, divergent elongated beams of light.

* * * * *